(12) United States Patent
Lindquist

(10) Patent No.: US 6,737,096 B2
(45) Date of Patent: May 18, 2004

(54) METHOD AND APPARATUS FOR PRODUCING A STERILE MILK PRODUCT

(75) Inventor: Anders Lindquist, Helsingborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/987,937

(22) Filed: Nov. 16, 2001

(65) Prior Publication Data

US 2002/0028278 A1 Mar. 7, 2002

Related U.S. Application Data

(63) Continuation-in-part of application No. 09/883,247, filed on Jun. 19, 2001, now Pat. No. 6,652,900, which is a continuation-in-part of application No. 09/709,419, filed on Nov. 13, 2000, now Pat. No. 6,372,276, which is a continuation-in-part of application No. 09/446,270, filed on Mar. 29, 2000, now Pat. No. 6,326,044.

(51) Int. Cl.⁷ .............................. A23C 3/02; A01J 11/10
(52) U.S. Cl. ........................... 426/522; 99/452; 99/456; 210/651; 426/491
(58) Field of Search ................ 426/491, 495, 426/522, 580; 99/452, 456; 210/650, 651, 636

(56) References Cited

U.S. PATENT DOCUMENTS

| | | |
|---|---|---|
| 3,233,964 A | 2/1966 | Skoldberg |
| 3,973,048 A | 8/1976 | Sollerud |
| 3,983,257 A | 9/1976 | Malmberg et al. |
| 4,175,141 A | 11/1979 | Adams, Jr. et al. |
| 4,340,479 A | 7/1982 | Pall |
| 4,515,823 A | 5/1985 | Kirshenmann |
| 4,560,567 A | 12/1985 | Rausing |
| 4,853,246 A | 8/1989 | Stevens |
| 4,876,100 A | 10/1989 | Holm et al. |
| 4,894,243 A | 1/1990 | Ahrné |
| 4,931,302 A | 6/1990 | Leshik et al. |

(List continued on next page.)

FOREIGN PATENT DOCUMENTS

| | | |
|---|---|---|
| GB | 2209919 A | 5/1989 |
| WO | 86/01687 | 3/1986 |
| WO | 87/05469 | 9/1987 |
| WO | 94/26121 | 11/1994 |
| WO | 96/08155 | 3/1996 |
| WO | 96/36238 | 11/1996 |
| WO | 97/49295 | 12/1997 |
| WO | 98/02047 | 1/1998 |
| WO | 98/41102 | 9/1998 |
| WO | 98/57549 | 12/1998 |

OTHER PUBLICATIONS

"8. Alternative Methods: Legal and Control Aspects" H. Glaeser, European Commission, Heat Treatments & Alternative Methods, Proceedings of the IDF Symposium held in Vienna (Austria), Sep. 6–8 1995, pp. 438–447.
"Filter Out Bacteria", Dairy Foods® Mar. 1996, p. 55.
"Psychotrophs in Dairy Products: Their Effects and Their Control" Claude P. Champagne et al., Critical Reviews in Food Science and Nutrition, vol. 34, Issue 1, 1994, pp. 1–30.
"Dairy Technology", Food Science and Technology, Research Report 1988–89, pp. 96–105.

*Primary Examiner*—George C. Yeung
(74) *Attorney, Agent, or Firm*—Burns, Doane, Swecker & Mathis, L.L.P.

(57) ABSTRACT

A process and apparatus for producing a sterile milk product from raw milk is disclosed. After separation, the skim milk portion is conducted to a primary filter assembly having a plurality of microfiltration units arranged in series. Bacteria having a size larger than the pores in the microfilters are retained in the retentate. The retentate is discharged from the primary filter assembly and flows to a secondary filter assembly having a plurality of microfiltration units. The permeate from the units in the primary filter assembly are combined and subjected to heat treatment.

23 Claims, 2 Drawing Sheets

U.S. PATENT DOCUMENTS

| | | |
|---|---|---|
| 5,137,738 A | 8/1992 | Wynn |
| 5,256,437 A | 10/1993 | Degen et al. |
| 5,338,553 A | 8/1994 | Johnson et al. |
| 5,356,651 A | 10/1994 | Degen et al. |
| 5,401,523 A | 3/1995 | Degen et al. |
| 5,576,040 A | 11/1996 | Moller et al. |
| 5,679,780 A | 10/1997 | Jensen et al. |
| 5,683,733 A | 11/1997 | Krabsen et al. |
| 5,685,990 A * | 11/1997 | Saugmann et al. ......... 426/491 |
| 5,935,632 A | 8/1999 | Larsen |
| 5,955,128 A * | 9/1999 | Bayevsky et al. .......... 426/491 |
| 6,117,470 A | 9/2000 | Lindquist |
| 6,326,044 B1 | 12/2001 | Lindquist |

* cited by examiner

METHOD AND APPARATUS FOR PRODUCING A STERILE MILK PRODUCT

CROSS-REFERENCE TO RELATED APPLICATIONS

This application is a continuation-in-part of application Ser. No. 09/883,247, filed Jun. 19, 2001 now U.S. Pat. No. 6,652,900, which is a continuation-in-part of application Ser. No. 09/709,419, filed Nov. 13, 2000 now U.S. Pat. No. 6,372,276; which is a continuation-in-part of application Ser. No. 09/446,270, filed Mar. 29, 2000 now U.S. Pat. No. 6,326,044, the priority of each of which is claimed, and each of which is incorporated herein by reference in its entirety.

FIELD OF THE INVENTION

The invention relates generally to a method and a plant for processing milk and, in particular, to a method and a plant for producing a sterile milk product.

BACKGROUND OF THE INVENTION

Milk processing typically involves several steps, including separation of raw milk into a milk portion and a cream portion, filtering the milk portion to form a permeate and a retentate, heating and/or filtering the permeate to reduce the number of live microorganisms, heating the cream to reduce the number of live microorganisms, recombining the treated cream and treated milk, homogenizing the combined milk and cream, and packaging the resultant milk product.

In order to increase the efficiency of milk processing and reduce costs, it is desirable that the amount of raw milk lost or discarded during each step of milk processing be minimized.

Raw milk naturally contains various microorganisms such as bacteria, yeast and mold. Additionally, raw milk may come into contact with and retain additional microorganisms during storage and transport. These microorganisms can contribute to the degradation and eventual spoilage of milk. It is therefore desirable to remove or deactivate these microorganisms.

Microorganisms such as bacteria can be categorized by size and/or heat sensitivity. Heat resistant bacteria are bacteria which can be deactivated by, for example, heating to a temperature of from at least about 140° C. to about 150° C. for about 4 to about 6 seconds as known to practitioners in the art. This category of bacteria is normally referred to as spores, and includes bacteria of species Bacillus and Clostridium. These bacteria, as defined by their least diameter, are about 0.5 $\mu$m or larger. The smallest heat resistant bacterium identified in milk by the inventor is *Bacillus pumilis*, which has a least diameter of about 0.5 $\mu$m.

Thermoduric bacteria are bacteria which are deactivated by, for example, heating to temperatures of about 100° C. for a few seconds, or equivalent time and temperature combinations as known to practitioners in the art. The smallest thermoduric bacterium identified in milk by the inventor is microbacterium Lacticum, which has a least diameter of about 0.3–0.4 $\mu$m. Thus, these bacteria have a least diameter of about 0.3 $\mu$m or larger.

Heat sensitive bacteria are bacteria which are deactivated by, for example, heating to temperatures as low as about 72° C. to about 75° C. for about 15 to about 20 seconds, or equivalent time and temperature combinations as known to practitioners in the art. The smallest heat sensitive bacterium has a least diameter of less than about 0.3 $\mu$m.

Raw milk also contains naturally occurring enzymes, as well as extracellular enzymes produced by microorganisms, such as psychrotrophic bacteria, which are typically present in milk. Certain of these enzymes are known to be bound to somatic cells which typically have a least diameter larger than about 0.5 $\mu$m. These enzymes can also contribute to the degradation and eventual spoilage of milk.

It is desirable to remove or deactivate the above types of bacteria and enzymes, as well as other microorganisms, in order to prevent degradation of the raw milk and/or resultant milk products. Typically, microorganisms and enzymes are deactivated by heat treatments and/or removed by filtration of the raw milk. The use of heat treatments alone, however, can impart an undesirable cooked flavor to the milk due to the high temperatures (e.g., 140–150° C.) required to deactivate heat resistant microorganisms. Also, filtration alone does not remove all live microorganisms present in the raw milk.

Combinations of filtration and heat treatment have been used to provide a purer milk product wherein more of the microorganisms are removed or deactivated than would occur using either heat treatment or filtration alone. See, for example, WO 98/57549 and U.S. Pat. No. 5,935,632.

Filtration produces a retentate in which the microorganisms are highly concentrated. The concentration of microorganisms in the retentate can be, for example, at least about 10 to 100 times higher than in the raw milk. This retentate typically comprises from at least about 1% to about 10% of the total incoming raw milk. Multiple filtrations of the retentate produce a final retentate in which the microorganisms are even more concentrated, but wherein less milk is retained in the retentate, typically about 1% or less. See, for example, WO 98/57549.

The retentate from filtration can be recycled into the milk or cream processing stream as described, for example, in U.S. Pat. No. 5,935,632, wherein the retentate is added to the cream portion for processing with the cream, or in U.S. Pat. No. 5,683,733, wherein the retentate is added to the milk processing stream before the milk processing stream is fed to the separator. In either case, the number of microorganisms in the cream portion or in the resultant milk product is increased. The retentate can also be discarded as waste, as described, for example, in WO 98/57549. However, this results in a lower yield.

There thus remains a need in the art to develop a process by which the concentration of microorganisms in the milk product can be reduced while the yield or the percentage of raw milk which becomes final milk product is increased.

SUMMARY OF THE INVENTION

It is an object of this invention to provide a process and apparatus for producing a sterile milk product that overcomes the deficiencies of the prior processes and apparatus. The process in accordance with a preferred embodiment of the invention includes: filtering a skim milk portion through a primary filter assembly and through a secondary filter assembly. The primary filter assembly includes individual filters arranged in series. The individual filters each have a microfilter that retains at least a portion of the microorganisms and passes the remaining fluid through the filter. Thus, each filter in the series produces a permeate stream and a retentate stream. The next filter in the series receives the retentate from the preceding filter and produces a permeate stream that contains fewer microorganisms and a retentate stream that contains progressively more microorganisms. Each filter in the primary filter assembly provides a permeate that has substantially fewer microorganisms than are presented in the skim milk portion that is supplied to the first filter of the primary assembly.

The permeate stream from the individual filters of the primary filter assembly is supplied to a heat treatment operation or other appropriate treatment to produce a stable milk product having a long shelf life.

The total retentate discharge from the first assembly flows to the secondary filter assembly which contains one or more individual filters. In the secondary filter assembly, the permeate stream from each individual filter is collected and conducted selectively to the supply conduit for the skim milk portion, or to the standardization unit, or other suitable processing step. The retentate stream from the first filter is fed into the next filter and the retentate from the last filter in the second assembly is conducted to an appropriate disposal site.

The filters in the second filter assembly preferably have equal or bigger pore size than the last filter in the primary filter assembly. The individual filters in the primary filter assembly preferably have equal or progressively smaller pore sizes from one individual filter to the next in the series. Preferably, the first individual filter has a pore diameter that is sufficiently large to retain all microorganisms having a least diameter of less than or equal to 0.5 $\mu$m. Bacteria having a relatively larger least diameter are retained by the filter as the skim milk portion passes through the filter into the permeate stream. The retentate is conducted to the next filter. This process is repeated at each filter in the series. In this manner, the concentration of bacteria in the retentate becomes progressively larger for each filter in the series. In the secondary filter assembly, the individual filters have equal or progressively smaller pore sizes from one filter to the next in a series, so that additional bacteria is removed and the permeate can be supplied to the raw milk stream, or the skim milk portion, or the cream portion.

BRIEF DESCRIPTION OF THE DRAWINGS

Preferred embodiments of the invention are described herein with reference to the accompanying drawings in which.

DETAILED DESCRIPTION OF THE INVENTION

The apparatus and process of this invention as described herein produce a milk product at high yields wherein the milk product has a reduced concentration of microorganisms compared to raw milk. According to a preferred embodiment of the invention, the yield of the process is such that at least about 99% of the skim milk portion of the raw milk is processed into a final milk product. More preferably, at least about 99.5% of the milk portion and most preferably at least about 99.8% of the milk portion of the raw milk is processed into a final milk product.

Certain terminology as used herein is specifically defined below. Other terminology is defined elsewhere within the body of the text. Unless otherwise specified, all uses of a particular term are intended to have the meaning set forth herein. Undefined terms have their ordinary meaning as known to practitioners in the art.

By "sterile" it is meant an absence of microorganisms capable of multiplying under prevailing storage conditions.

By "stable" it is meant that the milk fraction and/or milk product does not degrade noticeably during a specified time period, wherein degradation is indicated by a change in flavor and/or texture of the milk product, usually accompanied by a change in odor.

By "shelf life" it is meant the period of time for which the milk product remains stable.

By "raw milk" is meant untreated milk. Raw milk is separated into a cream portion which is a standardized portion of raw milk having a fat content of between about 12% and about 65%, preferably about 40%, and skim milk portion having a fat content of from about 0.05% to about 0.15%.

By "skim milk portion" is meant the milk portion that is fed into the first filter. The skim milk portion can be skim milk (e.g., from the separator) or standardized milk provided by the addition of cream to the skim milk from the separator. The standardized milk comprises a specified amount of fat, typically at least 0.05% fat.

By "permeate" is meant the milk portion which has passed through at least one filter in the first filter assembly.

By "retentate" is meant the milk portion retained by at least one filter in the first filter assembly.

By "milk product" is meant the milk portion after processing by filtration and heating methods, which forms a consumer ready milk beverage or is made into another consumer milk product.

Figure 1:
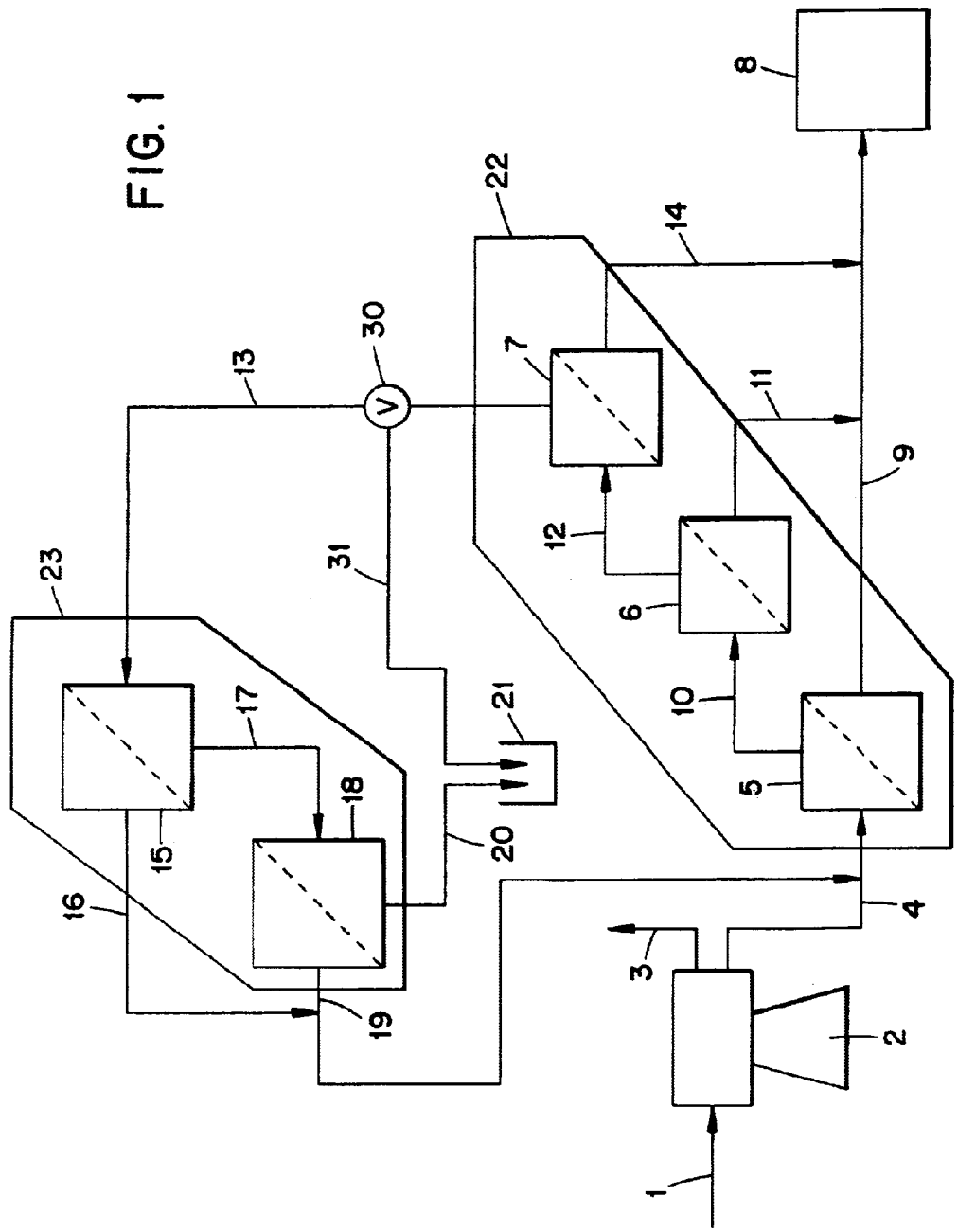
FIG. 1 is a flow diagram of the process for forming sterile milk according to the invention.

As shown in FIG. 1, raw milk 1 to be treated is conveyed by a conduit 1 to a separator 2. The separator 2 can be a conventional separator, requiring the raw milk to be heated to a temperature from about 50° C. to about 60° C. Alternatively, a cold separator may be employed at a temperature of from about 4° C. to about 6° C. and the raw milk may not be heated before separation. The raw milk 1 is separated by separator 2 into cream portion 3 and skim milk portion 4. Both the cream portion 3 and the skim milk portion 4 are maintained at a low temperature of from about 4° C. to about 15° C. if a cold separator is used, or at higher temperatures of from about 45° C. to about 60° C. if a conventional separator is employed. Preferably, for ease of production, a conventional separator is used and separation occurs at a temperature of from about 45° C. to about 60° C., most preferably from about 50° C. to about 55° C.

The cream portion 3 flows to a standardization unit to form a standardized cream portion having a desired fat content. The standardized cream portion can be admixed into the skim milk portion before filtration thereof to provide the skim milk portion with a desired fat content. For purposes of simplicity, the skim milk portion fed into the first filter, whether skim milk or standardized milk, will be referred to as the skim milk portion.

In the present invention, filtration is preferably conducted at a skim milk portion temperature of from about 45° C. to about 60° C., preferably from about 50° C. to about 55° C. The skim milk portion is supplied through the conduit 4 to a primary filter assembly 22 comprising multiple filters. In the preferred embodiment of FIG. 1, the primary filter assembly 22 has a first filter 5, a second filter 6, and a third filter 7. The filters can be made any suitable material (e.g., ceramic, glass, polymeric fiber, etc.) or combination of materials known in the art. Suitable filtration media include those disclosed in U.S. Pat. No. 5,256,437, which is hereby incorporated by reference.

In a preferred embodiment of the invention, the first filter 5 (FIG. 1) has an effective pore size of about 0.5 $\mu$m or less, meaning that the first filter 5 is capable of effectively separating from the skim milk portion 4 all microorganisms, cells, enzymes or other materials which are larger than or equal to 0.5 μm, including all heat resistant bacteria. Effective separation means a reduction in the concentration of microorganisms by a factor of at least about 1,000,000, or a reduction of about log 6 or greater. Preferably, the concentration of microorganisms present in the first permeate, particularly the concentration of heat resistant bacteria such as B. Pumilis, as compared to the milk portion 4 is reduced by a factor of at least about log 8, most preferably by at least about log 9.

For any given filter, the effective pore size may not correspond to the actual pore size of the filter. Depending on the type of filter, the actual pore size of the filter may be larger or smaller than the effective pore size. The interaction of the various components of the milk with the material of the filter as well as the operating conditions during filtration can influence the effective pore size of the filter.

In an alternative embodiment, the first filter 5 can have an effective pore size of about 0.3 μm or less, meaning that the first filter 5 is capable of effectively separating from the milk portion 4 all microorganisms, cells, or other materials which are equal to or larger than 0.3 μm in diameter, including all heat resistant bacteria and all thermoduric bacteria. By the use of such a filter, the number of microorganisms, in particular the number of thermoduric bacteria such as microbacterium Lacticum, can be reduced by a factor of at least about log 8, preferably at least about log 9, most preferably by at least about log 10. Any bacteria remaining in the first permeate 9 are heat sensitive. Filtration with a first filter 5 having an effective pore size of 0.3 μm or less can be combined with a heat treatment 8 of from about 72° C. to about 98° C., as described above. This combined treatment can be used to produce a sterile and stable milk product.

Although a small effective pore size is desirable in order to retain as many undesirable components in milk as possible, too small an effective pore size can be detrimental to milk processing. For example, if the effective pore size of the first filter 5 is too small, the pores of the first filter 5 can become clogged by the first retentate 10 and the speed of flow of the milk portion 4 through first filter 5 can thereby be reduced significantly.

The skim milk portion 4 is separated by the first filter 5 into a first permeate 9 and a first retentate 10. The first retentate 10 can comprise up to about 90% of the skim milk portion 4, or as small a proportion as 5% of the skim milk portion 4. When the first filter 5 has an effective pore size of 0.5 μm, the first retentate 10 comprises about 70% of the skim milk portion 4 in the case of three filters in the primary assembly. This first retentate contains all separated solids with a least diameter ≧0.5 μm.

The first retentate 10 is conducted from the first filter 5 to the second filter 6. As with the first filter 5, the second filter 6 is made of any suitable material (e.g., ceramics, polymer fibers, etc.) as described above. The second filter 6 preferably has an effective pore size that is equal to or smaller than the effective pore size of the first filter 5. Thus, when the first filter 5 has an effective pore size of about 0.5 μm, the second filter 6 has an effective pore size of 0.48–0.50 μm. The first retentate 10 is conducted to the second filter 6 which produces a second permeate 11 and a second retentate 12. This second permeate 11 preferably comprises about 35% less of the skim milk portion 4 (with 3 filters in the first assembly). The second retentate 12, which preferably comprises less than or equal to about 35% of the skim milk portion 4, contains all of the microorganisms, cells, enzymes and the like which are ≧0.5 μm and which have been separated from the skim milk portion 4 by the first filter 5 and from the first retentate 10 by the second filter 6.

The above percentages for the amounts of the first and second retentate are exemplary only. The total amount of retentate from the primary filter assembly will vary depending on the number of filters in the primary assembly and in the secondary assembly. The total amount will also depend on the addition of the amount of permeate from the secondary assembly being fed back into the skim milk portion into the primary assembly. The total amount of retentate from the primary assembly is preferably less than 5% of the skim milk portion if the permeate from the secondary assembly is not fed back and preferably less than 1% if that is not the case.

Each filtration concentrates the amount of microorganisms in the resultant retentate. The concentration of microorganisms in the first retentate 10, for example, can be increased by a factor of from about 2 to about 10 compared to the skim milk portion 4. Similarly, filtration of the first retentate 10 can further concentrate the microorganisms in the second retentate 12 by a factor of from about 2 to about 10. Thus, the concentration of microorganisms in the second retentate 12 as compared to the skim milk portion 4 can be increased by a factor of from about 4 to about 100. The degree of concentration of the microorganisms in the second retentate can be influenced by various factors such as, but not limited to, the area and efficiency of the first filter 5 and the second filter 6.

The second retentate 12 is supplied to the third filter 7, which is made of any suitable material known in the art, such as is described with respect to the first filter 5. The third filter has an effective pore size that is equal to or smaller than the effective pore size of the second filter 6. For example, when the effective pore size of the second filter 6 is 0.48–0.50 μm, the effective pore size of the third filter is preferably about 0.46–0.50 μm. The third retentate 13 that is produced by the third filter preferably comprises less than about 1–5% of the skim milk portion. Although the primary filter assembly 22 contains three successive filters, one or more filters can be included in the primary filter assembly, the use of these filters provides a reasonable balance between the effectiveness of removing microorganisms and the cost of installation and operation of the system.

The filters 5, 6 and 7 of the primary filter assembly 22 can each comprise one or a plurality of filters. The number of filters can be chosen based on various factors known in the art, including, but not limited to, the quality of the raw milk portion and the efficiency which is obtained with filter 5.

The permeates 11 and 14 from the second and third filters flow into the permeate stream 9 from the first filter 5 for subsequent heat treatment 8. This heat treatment is preferably conducted at a temperature of from about 90° C. to about 105° C. A combined filtration/heat treatment process of this type is described in WO 98/57549, and in co-pending U.S. patent application Ser. No. 09/709,419, filed Nov. 13, 2000, both of which are hereby incorporated by reference in their entirety. By using a combination of filtration and heat treatment, a milk product which is sterile and preferably stable can be obtained.

The retentate from the last filter in the primary filter assembly 22, which in the preferred embodiment is the retentate discharge 13, is conducted to a secondary filter assembly 23 which comprises at least one filter or two or more filters in series. The first filter 15 produces a first permeate 16 and a first retentate 17. The first retentate 17 is fed to the second filter 18 which produces a second permeate 19 and a second retentate 20. The first and second permeate steams 16 and 19 are combined and preferably are supplied to the skim milk portion. The second retentate stream 20 is discarded, as indicated schematically at 21.

The filters 15 and 18 that are contained in the secondary filter assembly 23 preferably have equal or larger pore size than the last filter 15 in the primary filter assembly, as described above for the filters of the primary filter assembly.

The system incorporating the primary filter assembly 22 and the secondary filter assembly 24 are interconnected by the conduit 13. However, it may be desirable under certain conditions to operate only the primary filter assembly 22. A valve 30 in the conduit 13 is arranged to stop the flow through the conduit 13 to the secondary filter assembly 23, and to divert the retentate flow to the discard location 21 through a conduit 31.

Figure 2:
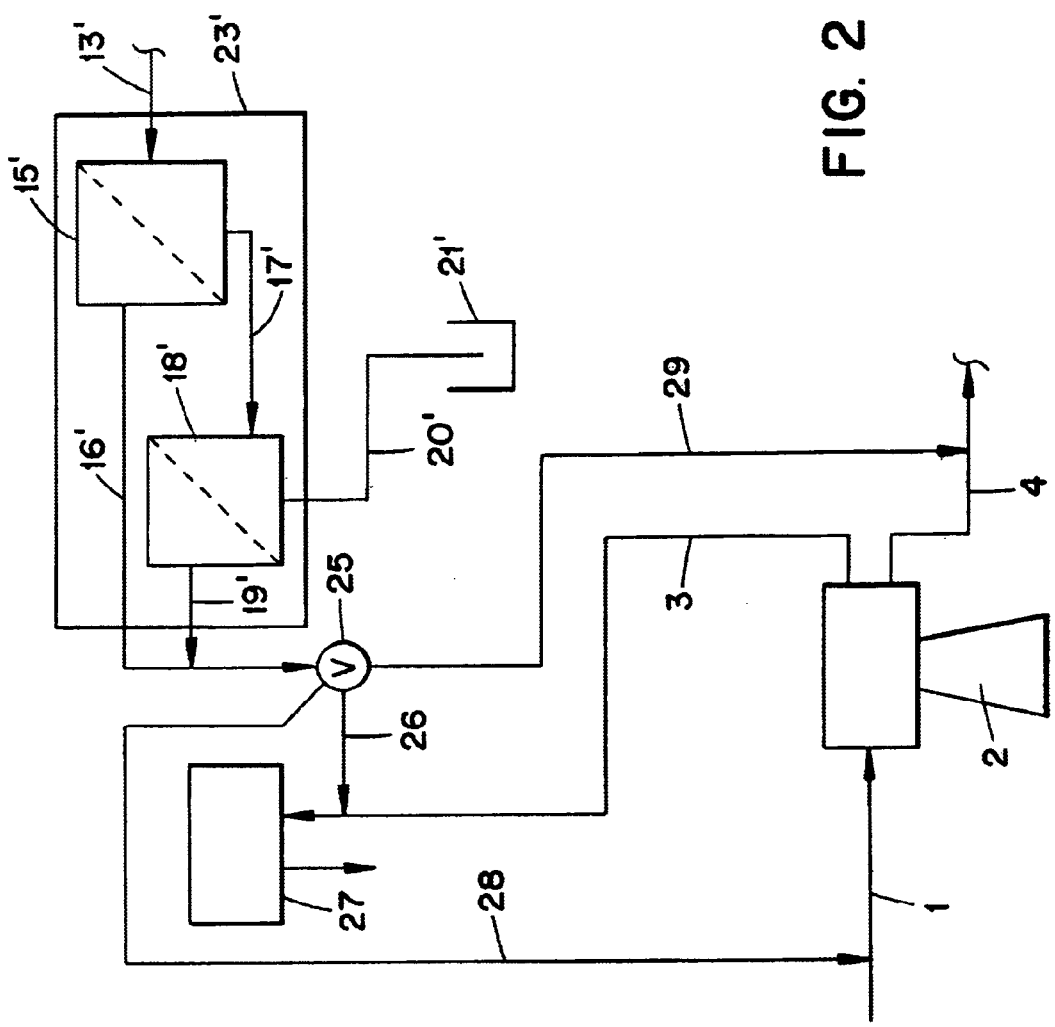
FIG. 2 is a flow diagram of a modified form of the process for forming sterile milk according to the invention.

An alternative system is shown in FIG. 2. The permeate streams 16' and 19' are conducted to a valve 25, which in a first position directs the flow of the permeate from the secondary filter assembly 24 to the cream portion 3 by a conduit 26, upstream from the standardization unit 27. When the valve 25 is in a second position, the permeate steam is conducted directly to the raw milk supply conduit 1 through a conduit 28. When the valve is in a third position, the permeate steam is directed to the skim milk portion through a conduit 29.

By combining the permeate steams 16' and 19' with the skim milk portion 4 in this manner, a diluted milk portion with a lower concentration of microorganisms than the skim milk portion 4 can be produced. Because the concentration of microorganisms in the diluted milk portion is lower than the concentration of microorganisms in the milk portion 4, the load on the filters of the primary filter assembly 22 can be reduced. Thus, recycling of the permeate through the conduit 29 into milk portion 4 can actually reduce the load on filters of the primary assembly, thereby extending the production time between cleaning of these filters and thereby reducing production costs.

While not wishing to be bound by theory, it is believed that homogenization of the retentate 13 from the primary filter assembly 22 can reduce the particle size of the milk components, such as fats and proteins, in particular casein, which can become aggregated during filtration. Homogenization can break up these aggregated milk components to form smaller particles which are more easily filtered in the secondary filter assembly.

While the invention has been described with reference to preferred embodiments and specific examples, it is to be understood that variations and modifications can be resorted to as will be apparent to those skilled in the art. Such variations and modifications are considered to be within the purview and scope of the invention as defined by the claims appended hereto.

What is claimed is:

1. Apparatus for producing a milk product having a reduced concentration of bacteria comprising:
    a primary filter assembly having at least one microfiltration unit, each microfiltration unit having a microfilter with an inlet conduit for supplying a skim milk portion to one side of the microfilter and a permeate outlet conduit on the opposite side of the microfilter, the at least one microfiltration unit having a retentate outlet conduit;
    a secondary filter assembly having at least one microfiltration unit, each microfiltration unit having a microfilter with an inlet conduit for supplying a skim milk portion to one side of the microfilter, a permeate outlet conduit on the opposite side of the microfilter, the at least one microfiltration unit having a retentate outlet conduit; and
    an interconnecting conduit between the retentate outlet conduit of the primary filter assembly and the inlet conduit of the secondary filter assembly;
    whereby the permeate stream from the primary filter assembly has a reduced concentration of bacteria.

2. The apparatus as claimed in claim 1 wherein the primary filter assembly includes a plurality of microfiltration units, the retentate outlet conduit of each unit being connected to the inlet conduit of the adjacent unit in a series relation.

3. The apparatus as claimed in claim 2 wherein the permeate outlet conduit of each unit is arranged to communicate with each other to form a combined stream.

4. The apparatus as claimed in claim 2 wherein the microfilter of each unit has a pore size of about 0.5 $\mu$m, or less.

5. The apparatus as claimed in claim 2 wherein the microfilter of each unit has a pore size of about 0.3 $\mu$m, or less.

6. The apparatus as claimed in claim 2 wherein the microfilter of at least one of the units has a pore size of 0.5 $\mu$m, or less.

7. The apparatus as claimed in claim 2 wherein the microfilter of at least one of the units has a pore size of 0.3 $\mu$m, or less.

8. The apparatus as claimed in claim 1 wherein the secondary filter assembly includes a plurality of microfiltration units, and the microfilter of each unit has a pore size larger than 0.5 $\mu$m.

9. The apparatus as claimed in claim 1 wherein the secondary filter assembly includes a plurality of microfiltration units, and the microfilter of each unit has a pore size larger than 0.3 $\mu$m.

10. The apparatus as claimed in claim 1 wherein the secondary filter assembly has a plurality of microfiltration units, the permeate outlet conduit of the secondary filter assembly being in communication with the inlet conduit of the primary filter assembly.

11. The apparatus as claimed in claim 3 including heat treatment means for heating the skim milk portion from the permeate outlet conduits of the primary filter assembly.

12. The apparatus as claimed in claim 1, including valve means for selectively closing the interconnecting conduit, and for directing the flow of retentate to a discard location.

13. A process for producing a sterile milk product comprising:
    (a) arranging a plurality of microfiltration units in a primary filter assembly, each unit having a microfilter providing a retentate stream and a permeate stream,
    (b) supplying a skim milk portion in a stream to the first microfiltration unit in the primary filter assembly;
    (c) conducting the retentate stream in series from the first unit to each subsequent unit, and thereby providing a retentate discharge stream from the primary filter assembly;
    (d) arranging a plurality of microfiltration units in a secondary filter assembly, each unit having a microfilter providing a retentate stream and a permeate stream;
    (e) supplying the retentate discharge stream to the secondary filter assembly;
    (f) combining the permeate stream from the respective microfiltration units of the primary filter assembly to produce the sterile milk product; and (g) supplying the permeate stream from the secondary filter assembly to the skim milk portion stream upstream from the primary filter assembly.

14. The process as claimed in claim 13, including separating the skim milk portion from a cream portion, and including supplying the permeate stream from the secondary filter assembly to the cream portion.

15. The process as claimed in claim 13 wherein the microfiltration units of the primary filter assembly have a pore size of about 0.50 $\mu$m, or less, and including subjecting the permeate stream to heat treatment sufficient to kill all remaining bacteria.

16. The process as claimed in claim 13 wherein the microfiltration units of the primary filter assembly have a pore size of about 0.30 $\mu$m, or less, and including subjecting the permeate stream to heat treatment sufficient to kill all remaining bacteria.

17. The process as claimed in claim 15 including selectively diverting the retentate discharge stream to a discard location.

18. The process as claimed in claim 15 wherein the heat treatment is carried out at a temperature in the range of about 72° C. to 98° C.

19. The process as claimed in claim 16 wherein the heat treatment is carried out in the range of about 72° C. to 98° C.

20. The process as claimed in claim 1 including selectively mixing the permeate stream from the secondary filter assembly with raw milk before separating into a cream portion and a skim milk portion.

21. The process as claimed in claim 15 wherein the concentration of microorganisms in the retentate of the first unit is increased by a factor of from less than about 2 to about 10 as compared to the skim milk portion.

22. The process as claimed in claim 15 wherein the concentration of microorganisms in the retentate of the second unit is increased by a factor of from less than about 2 to about 10 as compared to the retentate of the first unit.

23. The process as claimed in claim 15 wherein the concentration of microorganisms in the retentate of the third unit is increased by a factor of from less than about 2 to about 10 as compared to the retentate of the second unit.

* * * * *